United States Patent Office 3,790,551
Patented Feb. 5, 1974

---

3,790,551
PROCESS FOR PRODUCING BUTADIENE POLYMER
Yoshiharu Yagi, Toyonaka, Akira Kobayashi, Nishinomiya, and Hiroshi Sato, Takatsuki, Japan, assignors to Sumitomo Chemical Company, Limited, Osaka-fu, Japan
No Drawing. Filed June 4, 1971, Ser. No. 150,191
Claims priority, application Japan, June 4, 1970, 45/48,958
Int. Cl. C08d 1/14, 3/06
U.S. Cl. 260—94.3    10 Claims

ABSTRACT OF THE DISCLOSURE

A process for producing butadiene polymer which comprises polymerizing 1,3-butadiene in the presence of a catalyst system consisting essentially of (A) at least one of nickel and cobalt compounds, (B) a trialkyl aluminum compound, (C) a benzotrifluoride compound represented by the formula:

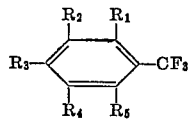

(wherein $R_1$, $R_2$, $R_3$, $R_4$ and $R_5$ are each a hydrogen atom, a halogen atom, an alkyl group or a fluoroalkyl group), and (D) a hydroquinone compound represented by the formula:

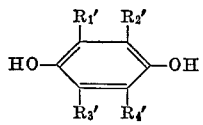

(wherein $R_1'$, $R_2'$, $R_3'$ and $R_4'$ are each a hydrogen atom or a halogen atom or the combination of $R_1'$ with $R_2'$ and/or of $R_3'$ with $R_4'$ is an aromatic condensed ring(s) and the remaining substituents are, if any, each a hydrogen atom or a halogen atom) and in the coexistence of water to give a butadiene polymer containing predominantly cis-1,4 structure and having a regulated molecular weight.

---

The present invention relates to a process for producing butadiene polymer. More particularly, it relates to a process for producing butadiene polymer containing predominantly cis-1,4-structure and having a regulated molecular weight.

In this specification, the term "alkyl" is preferred to be lower alkyl having 1 to 6 carbon atoms and the term "halogen" is intended to cover four kinds of halogen atoms, i.e. chlorine, bromine, iodine and fluorine.

As described in the copending patent application Ser. No. 38,487, filed May 18, 1970, the present inventors found previously that the polymerization of 1,3-butadiene in the presence of a catalyst system consisting essentially of (A) at least one of nickel and cobalt compounds, (B) a trialkyl aluminum compound, (C) a benzotrifluoride compound represented by the formula:

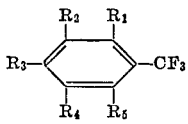

(wherein $R_1$, $R_2$, $R_3$, $R_4$ and $R_5$ are each a hydrogen atom, a halogen atom, an alkyl group or a fluoroalkyl group), and (D) a hydroquinone compound represented by the formula:

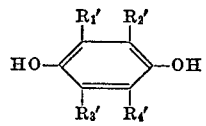

(wherein $R_1'$, $R_2'$, $R_3'$ and $R_4'$ are each a hydrogen atom or a halogen atom or the combination of $R_1'$ with $R_2'$ and/or of $R_3'$ wtih $R_4'$ is an aromatic condensed ring(s) and the remaining substituents are, if any, each a hydrogen atom or a halegen atom) can afford a butadiene polymer containing predominantly cis-1,4 structure.

In the above polymerization, the regulation of the molecular weight of the butadiene polymer can be accomplished by a per se conventional manner, i.e. controlling appropriately the composition, the preparation condition and the concentration of the catalyst system, the concentration of the monomer, the temperature of polymerization and the like. But, certain technical skill is required for such controlling.

As the results of the extensive study, it has now been found that the control of the water content in the polymerization reaction system makes it possible to regulate the molecular weight of the butadiene polymer with ease. It has also been found that the existence of water in the polymerization reaction system results not in the decrease of the polymerization rate but in the increase of the same, compared with those in the absence of water.

These findings are of unexpected and surprising nature, because the addition of water to a Ziegler-Natta catalyst system, into which the said catalyst system is classified, has been considered to afford rather a harmful influence of the polymerization and, therefore, the polymerization reaction system using such catalyst system has been usually kept anhydrous.

According to the present invention, 1,3-butadiene is polymerized in the presence of a catalyst system consisting essentially of (A) at least one of nickel and cobalt compounds, (B) a trialkyl aluminum compound, (C) the benzotrifluoride compound [I] and (D) the hydroquinone compound [II] and in the coexistence of water whereby a butadiene polymer containing predominantly cis-1,4 structure and having a regulated molecular weight is produced.

As the nickel and cobalt compounds, there may be employed the one(s) selected from various salts and organic complex compounds of nickel and cobalt such as nickel halides (e.g. nickel chloride), nickel sulfate, organic acid salts of nickel (e.g. nickel acetate, nickel naphthenate, nickel octanoate, nickel laurylbenzenesulfonate), complex compounds of nickel salts (e.g. nickel chloride-pyridine complex, tris(dipyridyl)nickel chloride, bis(ethylenediamine)nickel sulfate), organic coordination compounds of nickel or nickel chelate compounds (e.g. bis-dimethylglyoxymato nickel, bisethylacetoacetate nickel, bis-acetylacetonate nickel) and their cobalt alternatives. The use of the nickel compounds is generally preferred.

Examples of the trialkyl aluminum compound include trimethyl aluminum, triethyl aluminum, tri-n-butyl aluminum, triisobutyl aluminum and tri-n-hexyl aluminum.

Examples of the benzotrifluoride compound [I] are
benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride, 3,4-dichlorobenzotrifluoride,
2,3-dibromobenzotrifluoride,
2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride,
2-monofluoromethylbenzotrifluoride,
3-difluoromethylbenzotrifluoride,
1,3-bis(trifluoromethyl)benzene,
3-(3'-fluoropropyl)benzotrifluoride,
4-(2',3'-difluoropropyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride,
3-fluoro-4-trifluoromethylbenzotrifluoride, etc.

Examples of the hydroquinone compound [II] are hydroquinone,
tetrachlorohydroquinone,
2,3,5-trichlorohydroquinone,
2,5-dichlorohydroquinone,
2-chlorohydroquinone,
1,4-dihydroxynaphthalene,
1,4-dihydroxy-2,3-dichloronaphthalene,
9,10-dihydroxyanthracene,
1,4-dihydroxyanthracene,
1,4-dihydroxyphenanthrene, etc.

The catalytic activity of the catalyst system of the present invention is varied depending on the mixing ratio of the components, the mixing order of the components, the concentration of each component, the temperature at the preparation of the catalyst system and the like. Of these, the mixing ratio of the components has particularly a great influence on the catalytic activity. The molar ratios of the nickel or cobalt compound to the trialkyl aluminum compound (i.e. $(A)/(B)$), the trialkyl aluminum compound to the benzotrifluoride compound [I] (i.e. $(B)/(C)$) and the nickel or cobalt compound to the hydroquinone compound [II] (i.e. $(A)/(D)$) may vary the range from 0.001 to 2 (preferably 0.01 to 1), 0.1 to 5.0 and 0.01 to 100 (preferably 0.1 to 10), respectively. Further, the nickel or cobalt compound may be used preferably in 0.0001 to 5% based on monomer 1,3-butadiene.

The mixing of each of the components for preparation of the catalyst system can be accomplished in any optional order and is ordinarily carried out in the presence of a diluent. For obtaining the catalyst system with a higher activity, the nickel or cobalt compound and the trialkyl aluminum compound may be allowed to contact each other in the presence of a small amount of an aliphatic conjugated diene (e.g. 1,3-butadiene, isoprene, dimethylbutadiene). Such technique will prevent the formation of insoluble material during the preparation and can thus minimize the harmful influence caused by contamination with a small amount of impurity in the polymerization reaction system.

Water, which serves as the molecular weight regulator, may be used in any amount not exceeding 2 mol per one mol of the trialkyl aluminum compound. The use of a larger amount of water tends to afford the polymer of a higher molecular weight and, for instance, a butadiene polymer having an intrinsic viscosity of higher than 4.0 when measured in toluene at 30° C. can be produced.

The presentation of water to the polymerization reaction system may be effected by various manners. In one of such manners, water can be incorporated into the catalyst system on its preparation. That is, a part or whole of the desired amount of water may be presented in any one or all of the nickel or cobalt compound, the trialkyl aluminum compound, the benzotrifluoride compound [I] and the hydroquinone compound [II], or their mixtures respectively. A typical example of the incorporation procedure is as follows: admixing the trialkyl aluminum compound with the benzotrifluoride compound [I] in a diluent, heating the resultant mixture at an appropriate temperature and then cooling it to around ice freezing temperature, adding thereto a small amount of 1,3-butadiene, the nickel or cobalt compound and a mixture of the hydroquinone compound [II] with water in the said order and finally aging the resulting mixture; or the last but one operation may be modified so as to add to the cooled mixture a small amount of 1,3-butadiene, the hydroquinone compound [II] and a mixture of the nickel or cobalt compound with water in the said order. Another typical example of the incorporation procedure is as follows: dissolving or suspending the nickel or cobalt compound and the hydroquinone compound [II] in a diluent, adding a small amount of 1,3-butadiene thereto while cooling with an ice bath, adding further a previously prepared solution of the trialkyl aluminum compound with the benzotrifluoride compound [I] and then water thereto and finally aging the resultant mixture at an appropriate temperature.

Alternatively, water may be incorporated by way of absorption into 1,3-butadiene as well as admixture with a diluent to be applied as the reaction medium for the polymerization or by adding it to a whole mixture of the catalyst system, 1,3-butadiene and a diluent prior to or during the polymerization.

In a further alternative, water addition can be performed in more than one procedure; for example, water may be incorporated through the steps of adding it to the nickel or cobalt compound and then admixing the resultant mixture with a mixture of 1,3-butadiene and water.

As stated above, the molecular weight of the produced polymer can be intentionally regulated by varying the water content in the polymerization reaction system. The micro structure of the polymer is, however, not essentially influenced and the presence of cis-1,4 structure is normally recognized in not less than 90% butadiene unit.

In the polymerization of 1,3-butadiene according to the present invention, the reaction is effected under the environment substantially free from any inhibitive material which is occasionally encountered with the generally accepted Ziegler-Natta type catalysts.

Examples of the solvent as the diluent for the catalyst system and/or as the reaction medium for the polymerization include aromatic hydrocarbons (e.g. benzene, toluene, xylene), aliphatic hydrocarbons (e.g. hexane, heptane, benzin), alicyclic hydrocarbons (e.g. cyclohexane, Decalin), hydrogenated aromatic hydrocarbons (e.g. Tetralin), etc.

The polymerization is carried out by contacting 1,3-butadiene with the catalyst system in a liquid medium at a temperature from −30 to 150° C., preferably from 0 to 100° C. The catalyst system and 1,3-butadiene may be supplied to the reaction system in an optional order in the presence or absence of the liquid medium.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g. phenol-β-naphthylamine, 2,6-di-tert-butyl-p-cresol), and then the precipitate is collected and washed with methanol to obtain a substantially colorless rubber-like polymer.

The butadiene polymer produced by the present invention is rubber-like solid or highly viscous material. The analysis of the micro structure according to the infrared absorption method reveals the presence of cis-1,4-structure in most butadiene units.

Practical and presently preferred embodiments of the present invention are illustratively shown in the following examples wherein the intrinsic viscosity of the polymer is measured on the toluene solution at 30° C. and the micro structure of the polymer is determined from the infrared absorption spectrum according to the Morero's method [D. Morero et al.: Chim. e Ind., 41 758 (1959).

EXAMPLE 1

In the following procedure, the whole operations leading to completion of the polymerization are effected in argon stream. All of the starting material, the reagent and the solvent are previously dehydrated and deoxygenated.

A toluene solution of triethyl aluminum (2.17 ml.; 4.0 mmol) and benzotrifluoride (0.64 ml.; 5.2 mmol) are added to anhydrous toluene (13.3 ml.), and the resultant mixture heated at 100° C. for 1 hour. After cooling it to room temperature, liquefied butadiene (6.7 ml.; 4.5 g.) and a toluene solution of nickel naphthenate (1.58 ml.; 0.4 mmol) are added thereto. The resulting mixture is stirred at room temperature for 30 minutes, and toluene is added thereto to make 100 ml. whereby a catalyst solution is obtained.

In a glass ampoule reactor, a toluene solution of tetrachlorohydroquinone (8 ml.; 0.04 mmol) and hydrous toluene (in which the water content is determined precisely by the Karl-Fischer's method) (82 ml.) are admitted, and the above prepared catalyst solution (10 ml.) is added thereto. The resultant mixture is heated at 40° C. for 15 minutes. After cooling it to −10° C., liquefied butadiene (30 ml.; 22 g.) is added thereto. The reactor is sealed, and the polymerization is carried out at 40° C. for 5 hours. The reaction mixture is admixed with a solution of phenyl-β-naphthylamine in toluene, and the resulting mixture is poured into a solution of phenyl-β-naphthylamine in methanol. The precipitated rubber-like polymer is dried below 50° C. in vacuo.

The yield and the physical properties of the produced polymer are shown in Table 1.

TABLE 1

| No. | Water content (p.p.m.) [1] | Yield G. | Yield Percent | [η] (dl./g.) | Micro structure (percent) Cis-1,4 | Trans-1,4 | 1,2 |
| --- | --- | --- | --- | --- | --- | --- | --- |
| 1 | 1.0 | 15.7 | 71.4 | 1.47 | 92.5 | 2.9 | 4.6 |
| 2 | 21.1 | 14.7 | 66.8 | 2.01 | 94.3 | 2.5 | 3.2 |
| 3 | 28.1 | 16.7 | 76.0 | 2.29 | 93.9 | 2.7 | 3.5 |
| 4 | 38.8 | 18.0 | 81.8 | 2.73 | 93.9 | 2.6 | 3.5 |
| 5 | 72.4 | 16.6 | 75.5 | 3.33 | 94.0 | 2.7 | 3.4 |

[1] This value indicates the total water content based on the amount of the solvents used in the polymerization reaction system.

EXAMPLE 2

To a toluene solution (100 ml.) containing triethyl aluminum (7.33 mmol), benzotrifluoride (5.50 mmol) and butadiene (7.33 mmol), which is made by mixing liquefied butadiene with a toluene solution of triethyl aluminum and benzotrifluoride prepared as described in Example 1, a toluene solution of nickel naphthenate (100 ml.; 0.733 mmol) and hydrous toluene (324 ml.) are added thereto, and the resultant mixture is stirred at 23° C. for 30 minutes. A toluene solution of tetrachlorohydroquinone (143 ml.; 0.733 mmol) is added thereto, and the resulting mixture is heated at 23° C. for 15 minutes whereby a catalyst solution is obtained.

The above prepared catalyst solution (36 ml.) is then diluted with anhydrous toluene so as to make 130 ml. of the total volume. Butadiene (22 g.) is added to the diluted catalyst solution and polymerized at 40° C. for 3 hours as in Example 1. The reaction mixture is treated similarly.

The yield of the physical properties of the produced polymer are shown in Table 2.

TABLE 2

| No. | Water content (p.p.m.) | Yield G. | Yield Percent | [η] (dl./g.) | Micro structure (percent) Cis-1,4 | Trans-1,4 | 1,2 |
| --- | --- | --- | --- | --- | --- | --- | --- |
| 1 | 10.3 | 15.5 | 70.5 | 2.00 | 93.0 | 2.7 | 4.3 |
| 2 | 29.3 | 16.1 | 73.2 | 2.20 | 93.6 | 2.6 | 3.8 |
| 3 | 65.9 | 15.1 | 68.7 | 2.60 | 93.3 | 2.6 | 4.1 |
| 4 | 72.0 | 8.1 | 36.8 | 3.78 | 93.4 | 2.5 | 4.1 |
| 5 | 83.0 | 3.6 | 16.4 | 4.49 | 92.4 | 2.8 | 4.8 |

EXAMPLE 3

A mixture of triethyl aluminum (5.0 mmol) and 2-chlorobenzotrifluoride (5.0 mmol) in toluene (10 ml.) is heated at 100° C. for 1 hour. After cooling the treated solution with an ice bath, 1,3-butadiene (2.0 g.) is added thereto. The resultant mixture is admixed with nickel naphthenate (0.5 mmol) and then allowed to stand for 30 minutes. A 1/5 volume of the resultant mixture is admitted to a glass ampoule reactor wherein hydrous toluene (40 ml.) and tetrachlorohydroquinone (0.5 mmol) have been previously charged, and the resultant mixture is heated at 40° C. for 15 minutes whereby a catalyst solution is obtained.

To the above prepared catalyst solution, 1,3-butadiene (11 g.) is added while cooling with an ice bath, and the reactor is sealed. The polymerization is carried out at 40° C. for 5 hours and the reaction mixture is treated as in Example 1.

The yield and the physical properties of the produced polymer are shown in Table 3.

TABLE 3

| No. | Water content (p.p.m.) | Yield G. | Yield Percent | [η] (dl./g.) | Micro structure (percent) Cis-1,4 | Trans-1,4 | 1,2 |
| --- | --- | --- | --- | --- | --- | --- | --- |
| 1 | 3.4 | 10.6 | 96.0 | 1.40 | 90.5 | 4.5 | 5.0 |
| 2 | 30.5 | 10.4 | 94.5 | 2.30 | 90.1 | 5.0 | 4.9 |

What is claimed is:

1. A process for producing butadiene polymer which comprises polymerizing 1,3-butadiene in the presence of a catalyst system consisting essentially of (A) at least one of nickel and cobalt compounds, (B) a trialkyl aluminum compound, (C) a benzotrifluoride compound represented by the formula:

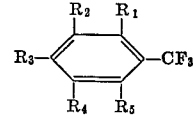

(wherein $R_1$, $R_2$, $R_3$, $R_4$ and $R_5$ are each a hydrogen atom, a halogen atom, an alkyl group or a fluoroalkyl group), and (D) a hydroquinone compound represented by the formula:

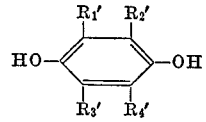

(wherein $R_1'$, $R_2'$, $R_3'$ and $R_4'$ are each a hydrogen atom or a halogen atom or the combination of $R_1'$ with $R_2'$ and/or of $R_3'$ with $R_4'$ is an aromatic condensed ring(s) and the remaining substituents are, if any, each a hydrogen atom a halogen atom) and in the coexistence of water in an amount not exceeding 2 mol per 1 mol of the trialkyl aluminum compound, to give a butadiene polymer containing predominantly cis-1,4 structure and having a regulated molecular weight.

2. The process according to claim 1, wherein the molar ratios of the nickel or cobalt compound to the trialkyl aluminum compound, the trialkyl aluminum compound to the benzotrifluoride compound and the nickel or cobalt compound to the hydroquinone compound are from 0.001 to 2, from 0.1 to 5.0 and from 0.01 to 100, respectively.

3. The process according to claim 1, wherein the nickel or cobalt compound is used in 0.0001 to 5% based on monomer 1,3-butadiene.

4. The process according to claim 1, wherein the amount of water is from 0.01 to 2 mol per 1 mol of the trialkyl aluminum compound.

5. The process according to claim 1, wherein the nickel or cobalt compound is selected from the group consisting of nickel halides, nickel sulfates, organic acid salts of nickel, complex compounds of nickel salts, organic coordination compounds of nickel and nickel chelate compounds, and their cobalt alternatives.

6. The process according to claim 1, wherein the trialkyl aluminum compound is selected from the group consisting of trimethyl aluminum, triethyl aluminum, tri-n-butyl aluminum, triisobutyl aluminum and tri-n-hexyl aluminum.

7. The process according to claim 1, wherein the hydroquinone compound is selected from the group consisting of tetrachlorohydroquinone, 2,3,5-trichlorohydroquinone, 2,5-dichlorohydroquinone and 2-chlorohydroquinone, and their alternatives with other kind of halogen atoms, hydroquinone, 1,4-dihydrooxynaphthalene, 1,4 - dihydroxy-2,3-dichloronaphthalene, 9,10-dihydroxyanthracene, 1,4-dihydroxyanthracene and 1,4-dihydroxyphenethrene.

8. The process according to claim 1, wherein the benzotrifluoride compound is selected from the group consisting of benzotrifluoride,
2-chlorobenzotrifluoride,
3-chlorobenzotrifluoride,
4-chlorobenzotrifluoride,
2-bromobenzotrifluoride,
3-bromobenzotrifluoride,
4-bromobenzotrifluoride,
2,5-dichlorobenzotrifluoride,
3,4-dichlorobenzotrifluoride,
2,3-dibromobenzotrifluoride,
2,5-difluorobenzotrifluoride,
3,5-difluorobenzotrifluoride,
2-methylbenzotrifluoride,
3-methylbenzotrifluoride,
4-methylbenzotrifluoride,
2-hexylbenzotrifluoride,
4-hexylbenzotrifluoride,
2-dodecylbenzotrifluoride,
4-dodecylbenzotrifluoride,
2-monofluoromethylbenzotrifluoride,
3-difluoromethylbenzotrifluoride,
1,3-bis(trifluoromethyl)benzene,
3-(3'-fluoropropyl)benzotrifluoride,
4-(2',3'-fluoropropyl)benzotrifluoride,
1,3,5-tris(trifluoromethyl)benzene,
2-methyl-4-chlorobenzotrifluoride,
3-bromo-4-ethylbenzotrifluoride,
2-methyl-4-trifluoromethylbenzotrifluoride and
3-methyl-4-trifluoromethylbenzotrifluoride.

9. The process according to claim 1, wherein the nickel or cobalt compound is selected from the group consisting of nickel chloride, nickel sulfate, nickel acetate, nickel naphthenate, nickel octanoate, nickel salts of organic sulfonic acids, nickel chloride-pyridine complex, tris(dipyridyl)-nickel chloride, bis(ethylenediamine)-nickel sulfate, bis-dimethylglyoxymato nickel, bis-ethylacetoacetate nickel, bis-acetylacetonate nickel and their cobalt alternatives.

10. The process according to claim 1, wherein the polymerization is carried out at a temperature from −30 to 150° C.

References Cited
UNITED STATES PATENTS

| | | | |
|---|---|---|---|
| 3,066,127 | 11/1962 | Carlson | 260—94.3 |
| 3,311,603 | 3/1967 | Cheney | 260—93.7 |
| 3,510,466 | 5/1970 | Lugli et al. | 260—94.3 |

JOSEPH L. SCHOFER, Primary Examiner

W. F. HAMROCK, Assistant Examiner

U.S. Cl. X.R.

252—429 A, 429 C, 431 R, 431 C